United States Patent [19]
Chen et al.

[11] 4,176,025
[45] Nov. 27, 1979

[54] ISOTOPE DISSOCIATION SELECTIVE ELECTRON ATTACHMENT AND SEPARATION

[75] Inventors: Cheng-Lin Chen; Peter J. Chantry, both of Pittsburgh, Pa.

[73] Assignee: Westinghouse Electric Corp., Pittsburgh, Pa.

[21] Appl. No.: 608,306

[22] Filed: Aug. 27, 1975

[51] Int. Cl.² .............................................. B01J 1/10
[52] U.S. Cl. ..................... 204/157.1 R; 204/DIG. 11; 250/423 P; 250/527; 55/2; 55/102; 55/151; 55/138
[58] Field of Search .................. 55/2, 5, 102, 151, 17, 55/138; 204/DIG. 11, 157.1 R; 250/527, 489, 423 P, 281

[56] References Cited
U.S. PATENT DOCUMENTS

| | | | |
|---|---|---|---|
| 3,443,087 | 5/1969 | Robieux et al. | 204/DIG. 11 |
| 3,772,519 | 11/1973 | Levy et al. | 250/423 P |
| 3,937,956 | 2/1976 | Lyon et al. | 204/157.1 R |
| 3,939,354 | 2/1976 | Janes | 250/423 P |
| 4,000,051 | 12/1976 | Kaldor | 204/157.1 |
| 4,000,420 | 12/1976 | Harris | 250/423 P |

FOREIGN PATENT DOCUMENTS 1959767  6/1971  Fed. Rep. of Germany ................. 55/2
2312194 10/1973  Fed. Rep. of Germany ................. 55/2

OTHER PUBLICATIONS

Hodgson et al., Isotope Separation using Laser Light, IBM, Bulletin Technical Disclosure, vol. 17, No. 11, 4/75, 2 pages.

Primary Examiner—Bernard Nozick
Attorney, Agent, or Firm—D. C. Abeles; Z. L. Dermer

[57] ABSTRACT

A method for separating isotopes in which a selected isotope of a given molecule is first excited to enhance preferential dissociative electron attachment, which facilitates the separation of the desired isotope from its natural mixture. Molecules incorporating the particular isotope of interest are selectively excited to the proper vibrational and/or electronic state by narrow line radiation to enhance preferential dissociative electron attachment. The excited molecules are then exposed to low energy electrons which dissociatively attach to the excited molecules forming stable negative ion fragments. The negative ion or neutral fragments containing the desired isotopes are then separated from the remaining mixture resulting in an enrichment of the desired isotope.

7 Claims, 8 Drawing Figures

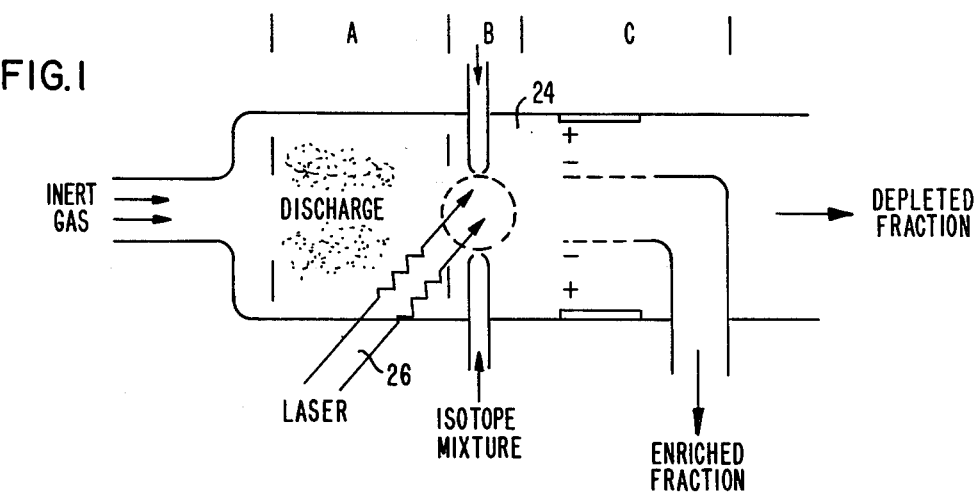
FIG.1
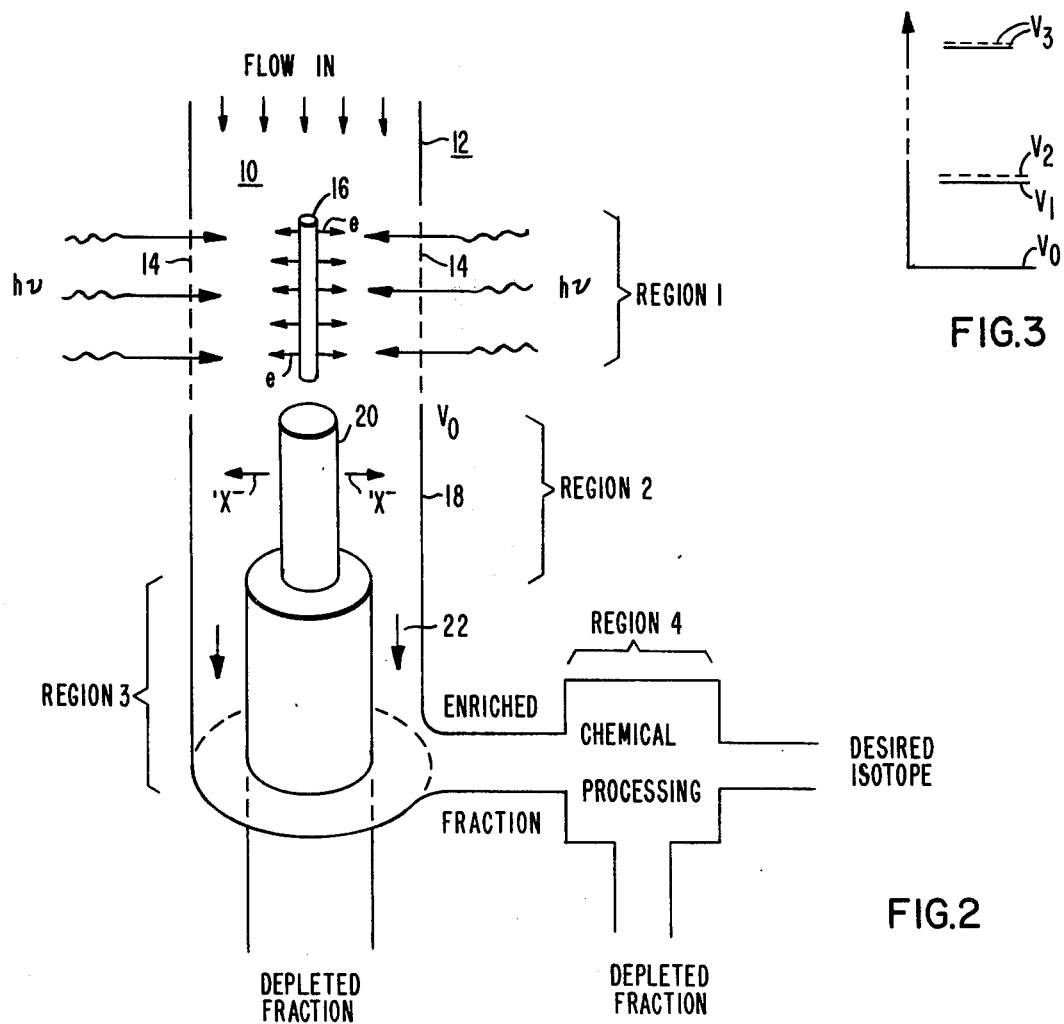
FIG.2
FIG.3

ISOTOPE DISSOCIATION SELECTIVE ELECTRON ATTACHMENT AND SEPARATION

BACKGROUND OF THE INVENTION

This invention relates generally to an isotopic separation process and, more particularly, to isotopic separation processes which employ dissociative electron attachment.

The separation of the isotope $^{235}U$ (which is fissionable by neutrons) from natural uranium, a mixture containing mainly nonfissionable $^{238}U$, or simply enrichment of the mixture in $^{235}U$ are extremely important processes for nuclear applications. The most commonly used process presently being employed on an industrial scale is separation by diffusion through a porous barrier. A number of other processes (electromagnetic separation employing devices derived from the mass spectrometer, for instance the so-called "calutron", separation by centrifugation, by thermal diffusion . . . ) have been used or suggested, but have not been employed for large scale operation.

A gaseous diffusion separation stage leads to a separation factor of approximately 1.004. Starting from natural uranium, for which the ratio $r=^{235}U/^{238}U$ is of the order of 0.7%, the obtaining of a product with an r ratio equal to 3% will necessitate about 1,100 diffusion stages. Thus, any improvement in the efficiency of the enrichment process will effect considerable savings.

As previously mentioned, uranium isotope separation can be accomplished in several ways. Recently, selective photoexcitation which leads to the preferential ionization of a particular isotopic component of a gas mixture has been explored as one process for improving the efficiency of uranium enrichment. Generally, in optical isotope separation schemes there are essentially three principal steps. The first is the preferential absorption of the optical radiation to produce selective excitation or ionization of the atoms or molecules which contains the desired isotopic species. The second step is enhancement of the rates of chemical reactions or physical phenomena with involve the atoms, molecules, or ions containing the desired isotopic species as the result of their preferential absorption and excitation. The third step involves the separation of the resulting atoms, molecules, or ions as the result of the enhancement.

Various procedures for performing the first two steps for optical isotope separation have been explored, and examples can be found in the patent to J. Robieux et al, entitled "Isotopic Separation Process", U.S. Pat. No. 3,443,087, issued May 6, 1969, and application Ser. No. 599,210 by G. L. Rogoff entitled "Process For Isotope Separation Employing Cataphoresis" filed July 25, 1975. The third step which accomplishes the actual separation of the desired isotope will be dependent upon which reaction process is employed in the second step. There are several methods by which this third step can be accomplished employing either condensation, photochemical, electric field, or magnetic separation. The degree of efficiency of the third separation step will therefore be dependent upon the effectiveness of the second step in establishing an enhanced reaction which uniquely segregates the isotope of interest in a constituent form that can be easily operated upon.

Accordingly, an isotope separation process is desired which will uniquely operate on a specific isotope in a gaseous molecular mixture in a manner to transform the isotope of interest into compatible form for efficient separation.

SUMMARY OF THE INVENTION

Briefly, this invention provides a method for separating out a specific isotope of interest from a gaseous molecular mixture wherein the isotope of interest is first selectively excited, which improves the overall efficiency of prior art isotope separation processes.

In accordance with the method of this invention, the gaseous mixture is contained within a partially bounded region. The isotope of interest is selectively excited within the gaseous molecular mixture and the excited molecules are exposed to free low energy electrons having energy at least equal to the dissociation energy of the molecule minus the sum of the energy of the molecule in its excited state over its ground state and the electron affinity of the fragment to which the electron attaches. A significant portion of the isotope of interest will then be transformed be dissociative electron attachment into a fragment of the original molecule which can readily be separated out of the gaseous mixture in enriched concentrations.

BRIEF DESCRIPTION OF THE DRAWINGS

For a better understanding of the invention, reference may be had to the preferred embodiment, exemplary of the invention, shown in the accompanying drawings, in which:

FIG. 1 is a schematic illustration of one embodiment of apparatus which can be employed to perform the method of this invention;

FIG. 2 is a second embodiment of apparatus which can be employed to perform the method of this invention;

FIG. 3 is a graphic illustration of the relative energy levels of several isotopes within an exemplary gas mixture;

DESCRIPTION OF THE PREFERRED EMBODIMENT

Figure 4:
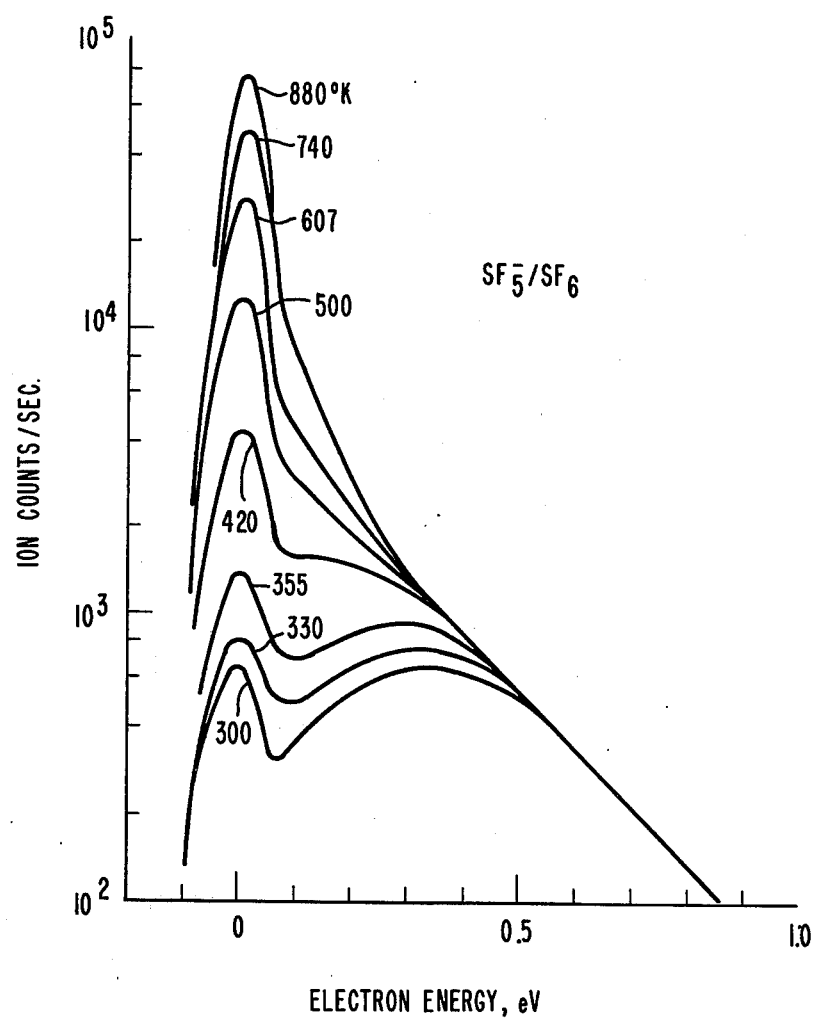
FIG. 4 is a graphical illustration of $SF_5^-$ production from $SF_6$ as a function of electron energy and gas temperature.

The method of this invention principally involves the second essential step of optical isotope separation and can be employed with a number of processes which achieve selective photoexcitation and ultimate segregation of the mixture enriched in the isotope of interest. One method of photoexcitation which is set forth in detail in the patent to Robieux et al, U.S. Pat. No. 3,443,087, will be described for achieving the first step which leads to selective excitation of a molecule containing the isotope of interest.

In effect, according to quantum theory and to the study of molecular spectra, a molecule may be in several different energy states, corresponding either to different electronic orbits or to different internuclear distances or to rotations of some elements of the molecule with respect to other elements. The optical spectra emitted when the molecule falls from one energy state to another are called, respectively, according to the cause of this fall, electronic spectrum, vibrational spectrum, rotational spectrum, with compound spectra being possible.

In addition, it is known that there exists for every molecule a stable configuration corresponding to a minimum energy state. Almost all the molecules are normally in this minimum state, commonly called the ground state, with energy $W_0$. It is also known, that under these conditions, molecules may reach another energy level of value $W_1$ by absorption of radiation having a frequency given by the difference in energy between the two states, the energy variation W equal to $W_1-W_0$ and the radiation frequency being related by Planck's equation: $W=h\mu$, where $\mu$ is the frequency and h is the quantum of action.

For one isotope of a given molecule, this excitation will occur for a particular value of the frequency of the exciting radiation, and for a second isotope of the same molecule the corresponding excitation will occur for a different value of the excitation frequency. This is the case in particular for a mixture of two isotopic compounds made, for instance, with $^{235}U$ and $^{238}U$.

According to the first step of the optical isotope separation process, the mixture of isotopic compounds is exposed to a narrow band radiation called in practice monochromatic, having the desired frequency for exciting the molecule of only one of the two compounds; the band being sufficiently narrow so as not to excite the other compound significantly.

FIG. 3 shows a scale of the energy levels of the molecules (for instance in electron volts). Level $V=0$ or $V_0$ corresponds to the ground state, which is the same for both types of molecules. Level $V_3$ is the ionized level (which will depend on the isotope), that is, the amount of energy required to free an electron and thus create a positive ion. For example, level $V_1$ is the excited level of $^{235}U$ and level $V_2$ is the excited level of $^{238}U$. If the mixture is exposed to radiation with an energy corresponding to the transition between $V_0$ and $V_1$,$^{235}U$ will be excited and will reach level $V_1$, but $^{238}U$ will not become excited and will remain at level $V_0$. If radiation of a conveniently selected energy is applied to the mixture in its present state as in the Robieux et al reference above, the excited molecules of energy level $V_1$ will be further excited to level $V_3$ and become positively ionized, while the molecules still at level $V_0$ will not reach level $V_3$ and will not become ionized. While preferential ionizaion of the selected isotope has been used as a step in a number of processes to provide a mixture enriched in the desired isotope the processes of this invention requires only that selective excitation of the desired isotope be achieved below the state of ionization.

Dissociation is the process by which molecular bonds are broken to establish a new mixture having a different atomic makeup. When dissociation is achieved by attachment of electrons having an appropriate energy level, fragment ions will be produced which are negatively charged species of the molecule having the different atomic makeup resulting from dissociation.

While a uranium mixture will be employed in the illustrative examples of the process of this invention set forth hereinafter, because of its importance in the production of nuclear fuel, it should be appreciated that the process of this invention has wide applicability to numerous molecules.

Thus, in accordance with the method of this invention the molecule with the particular isotope of interest in its natural mixture is selectively excited to the proper vibration and/or electronic state by narrow line radiation as explained above. A low energy electron is then dissociatively attached to the excited molecule and a stable negative ion is formed. The energy of the attaching electron must be at least equal to the energy required for dissociation of the molecule minus the exciting energy of the molecule and further minus the electron affinity of the fragment to which the electron is attached. The electron affinity is the binding energy of an electron to the fragment. The attachment cross-section, which is the effective target of the electron, can be very large and in principle approaches $10^{-14} cm^2$. More particularly the cross-section Q of an atom (or molecule) for a prescribed reaction with another particle P is defined to be such that the particle P, in travelling a small distance dx through a medium containing atoms (or molecules) uniformly distributed with number density N per $cm^3$, has a probability equal to NQdx of reacting with an atom (or molecule) in the prescribed manner. The formation of the negative ion significantly enhances separation of the desired isotope from the remaining mixture resulting in an enrichment of one isotope.

The process of dissociative electron attachment is well known and can be represented by the equation

$$e+KY\rightarrow X^-+Y$$

where X and Y may be atoms or molecules. The cross-section for dissociative attachment is in many cases strongly dependent on the degree of internal excitation of the target XY as has been shown in the formation of $SF_5^-$ from $SF_6$ where an increase of a hundred-fold in magnitude has been obtained as shown in FIG. 4 when the gas temperature is increased from 300° K to approximately 900° K, a factor of three. The attachment cross-section, in this case, approaches $10^{-14} cm^2$ at 900° K. A plot of the $SF_5^-/SF_6$ negative ion signal versus inverse gas temperature reveals an activation energy of 0.2 eV for the reaction

$$e(\sim OeV)+SF_6\rightarrow SF_5^-+F$$

Therefore, in accordance with this invention, a high intensity radiation source, such as a laser, having a wavelength tuned to the desired isotopic species (e.q. $^{32}SF_6$ or $^{34}SF_6$), and in the region of the known activation energy, in this case 0.2 eV equivalent to approximately 6 micron wavelength, can be used to excite selectively those states that have a high probability of zero energy electron attachment in $SF_6$ to form $SF_5^-$. The aforegoing experimental results indicate that electron attachment to gas molecules depends strongly upon the degree of internal excitation of the target molecules. This phenomena is employed, in accordance with this invention, to transform the isotope of interest in its natural mixture to a fragment negative ion which then can be collected either by electric or electromagnetic separation from the bulk of the gas, and/or by neutralization and extraction through appropriate chemical reactions or physical properties of the fragment, depending on the particular element involved.

Thus, generally, in accordance with this invention assuming two isotopes species $1_X$ and $2_K$ are present in their natural mixture in the target gas, then by virtue of the isotope shift in the absorption spectrum, it is possible to enhance the occurrence of $$h\mu + {}^1XY \rightarrow ({}^1XY)^*$$

over $$h\mu + {}^2XY \rightarrow ({}^2XY)^*$$

where the asterisk indicates that the molecule is in its excited state, by proper choice of the irradiating frequency. Therefore, it can be stated that $$e + ({}^1XY)^* \rightarrow {}^1X^- + Y$$

has a much larger cross-section and a lower threshold than $$e + {}^2XY \rightarrow {}^2X^- + Y$$

The negative ions $^1X^{31}$ can be created preferentially and be collected as described above.

As an illustrative example $^{235}U$ can be separated from the natural mixture containing predominantly $^{238}U$ through the reaction $$e + UF_6 \rightarrow UF_5^- + e,$$

which has a threshold of approximately 1 eV at room temperature and rises to a peak at approximately 2 eV electron energy. By irradiation of the gas by a dye laser (3,000–6,000 Å) the threshold for this reaction may be substantially selectively lowered for $^{235}UF_6$. In the presence of low energy electrons of approximately less than 1 eV, $^{235}UF_5^-$ can be formed preferentially over $^{238}UF_5^-$.

At relatively high pressures, such as might be used in the type of devices illustrated in FIGS. 1 and 2, the reaction $$UF_5^- + UF_6 \rightarrow UF_6^+ + UF_5$$

is possible. In this case regions 2 and 3 illustrated in FIG. 2 can be dispensed with, since the desired species would leave region 1 as neutral $^{235}UF_5$. At ordinary temperatures, $^{235}UF_5$ is a solid and may be expected to condense out providing a simple means of collection. It is possible if the temperature is not carefully controlled that $UF_5$ will react further while in the gaseous phase. For instance, in the case of $SF_5$, depending on the temperature, one can expect either $$2SF_5 \rightarrow S_2F_{10}$$

or $$2SF_5 \rightarrow SF_4 + SF_6$$

to occur.

If the last reaction occurs in the $UF_5$ case, the resultant products would be $^{235}UF_4$ and $^{235}UF_6$. This reaction sequence has the undesirable feature of recycling half of the $^{235}U$ originally "tagged" back to $^{235}UF_6$. On the other hand it retains the very desirable feature that $^{235}UF_4$ will naturally condense out as a solid, providing a simple means of collecting the product.

In the event that collection of the $^{235}U$ as solid $UF_5$ or $UF_4$ is not desired, advantage may be taken of the fact that both are more chemically reactive than $UF_6$ in order to isolate them by selective processing of the mixture ($UF_6$, $UF_5$, $UF_4$).

The embodiments illustrated in FIGS. 1 and 2 can be employed to accomplish the desired isotope separation process of this invention. A simple arrangement embodying the choices of both electric and chemical processing for the third step of separation is shown in FIG. 2. A natural isotopic mixture is introduced upstream to region 1 at the inlet 10 of the partially bounded cylindrical walled device 12. Region 1 defines the area where selective excitation and electron attachment occurs. Monochromatic photons enter radially through the mesh anode 14 causing selective excitation of the desired isotopic species as explained previously. Electrons for dissociative attachment are supplied by the concentric cathode 16 which can be supported, although not shown, from the cylindrical walls of the boundary 12. The voltage between the cathode 16 and anode 14 in region 1 is optimized to give maximum selective attachment producing a fragment ion of the selected isotope preferentially over the remaining isotopes in the natural mixture. The negative fragment ion produced in this way by dissociative electron attachment are attracted towards anodes 14 and 18 in regions 1 and 2. Region 2 has a non-emitting cathode 20 which can be supported in a manner similar to that of the cathode 16. The applied voltage across the cathode 20 and anode 18 is chosen to optimize the transport of the negative ions radially outwards. In region 3 the physical separation of the gas containing the bulk of the negative ions occurs by means of the coaxial annular region 22. The outer fraction, enriched in the desired isotope present either as a fragment ion, or following charge neutralization at the anode 18, as a neutral compound or atom, may if desired be further processed chemically, as is known in the art, in region 4 to produce a stable easily handled chemical compound containing the desired isotope. It is possible that regions 2 and 3 are unnecessary or undesirable, and that the products of region 1 can be treated directly by chemical means to isolate the desired isotope from the bulk of the gas mixture inasmuch as the desired isotope in its new form is more susceptible to chemical reaction.

The following is provided as an illustrative example of the process of this invention as applied to a mixture of $^{235}UF_6$ and $^{238}UF_6$ to obtain a mixture enriched in $^{235}U$. In order to have a clear picture on the progress of the separation process as a function of time in a realistic system, a computer code has been developed to track all species and calculate all relative parameters for the method of this invention as applied in a flow system. Employing the simplified embodiment illustrated in FIG. 1, the flow system consists of basically three sections: an electron production region, A; an injection of isotope mixture, selective excitation of one isotope species by means of the laser 26 and electron attachment region, B; and a separation of dissociated products region, C. Section A produces the necessary electrons for dissociative attachment, while section B provides the selectivity by optical excitation. The system illustrated has many degrees of freedom through adjustment of the inert gas pressure and temperature, flow velocity, electron production, isotope feed density, and laser intensity. Section C can be accomplished through either mechanical, electrical or chemical processes as previously described. While charge exchange has been indicated as a potential problem, in general charge exchange of the dissociatively attached fragment with its parent molecule is not likely to occur employing the method of this invention since the dissociated product has a different mass, and generally different physical and chemical properties. Charge transfer is likely to cause greatest difficulty in processes in which a parent ion, positive or negative, is selectively generated. In such a process, the reaction is symmetric and resonant and undoubtedly occurs with a rather large cross section. If, on the other hand, one selectively generates a fragment ion, as will occur employing the method of this invention, charge transfer is not likely to occur depending on the particular molecule employed. Even if if does occur, the consequences are likely to be far less serious since the simple electron transfer will leave the desired isotope neutral, for example

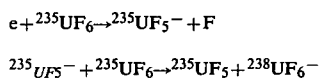

$$^{235}UF_5^- + ^{235}UF_6 \rightarrow ^{235}UF_5 + ^{238}UF_6^-$$

The undesirable reaction, involving transfer of F rather than simply an electron, $$^{235}UF_5^- + ^{238}UF_5.F \rightarrow ^{235}UF_6^- + ^{238}UF_5$$

is generally much slower since it involves the abstraction of an F atom from the neutral $UF_6$. For these reasons it is possible to assume that the scrambling effects of charge transfer are negligible compared, for example, to the effects of v-v (vibrational-vibrational) transfer. In fact, the electron transfer reaction that yields a negative fragment ion of $^{238}U$, or its counterpart in whichever molecule is used, can be a desirable feature of the overall process since it converts the desired product molecule from a charged to a neutral species, which avoids the problems associated with field penetration into a plasma where electrostatic separation is employed. In this instance, the desired isotope appears from the process as a different neutral chemical species, for example $^{235}UF_5$ in the above example, facilitating efficient chemical processing to finally isolate the product.

As previously explained the reaction $$h\mu + ^{235}UXY + ^{238}UXY \rightarrow (^{235}UXY)^* + ^{238}UXY$$
$$(^{235}UXY)^* + e \rightarrow ^{235}UX^- + Y$$

can be employed to separate out $^{235}UX$ in its ionized or neutral state. Alternatively the process can yield

which can also be considered as a desirable reaction for separation of $^{235}U$ as in the v-v transfer case. Subsequent separation of $^{235}UX^-$ or $^{235}UX$ from $^{238}UXY$ can then be accomplished by virtue of the uniqueness of its (i) charge, (ii) mass, (iii) chemical properties, or (iv) physical properties.

The computer calculations are accomplished by assuming that every dissociated molecule goes through the product channel and the remaining mixture goes to the waste channel. Absorption of photons is assumed to be completely selective, occurring with an absorption cross-section of $3 \times 10^{-17}$ cm$^2$/molecule of $^{235}UF_6$. The excited $^{235}UF_6$ molecules then suffer either dissociative attachment, with a rate coefficient assumed to be $k_a = 10^{-7}$ cm$^3$/sec, or vibrational-vibrational transfer to $^{238}UF_6$ with a rate coefficient of $k_{vv} = 10^{-9}$ cm$^3$/sec.

The ratio of $^{235}U$ to $^{238}U$ in the feed is assumed to be that of the natural abundance, i.e., 0.72:99.27. The initial electron number density is taken to be $10^{11}$ cm$^{-3}$ which will be explained hereinafter.

Figure 5:
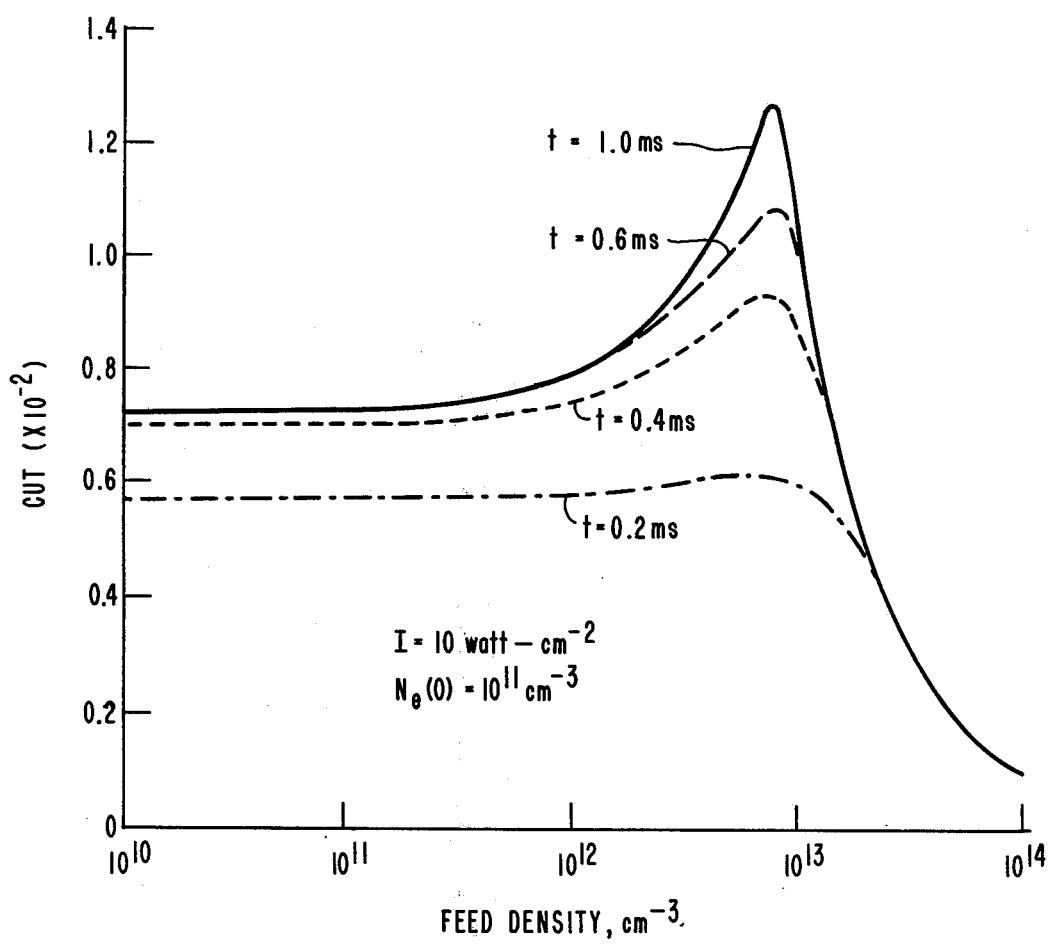
FIG. 5 is a linear-log plot of cut versus feed density for a given mixture containing uranium isotopes.
Figure 6:
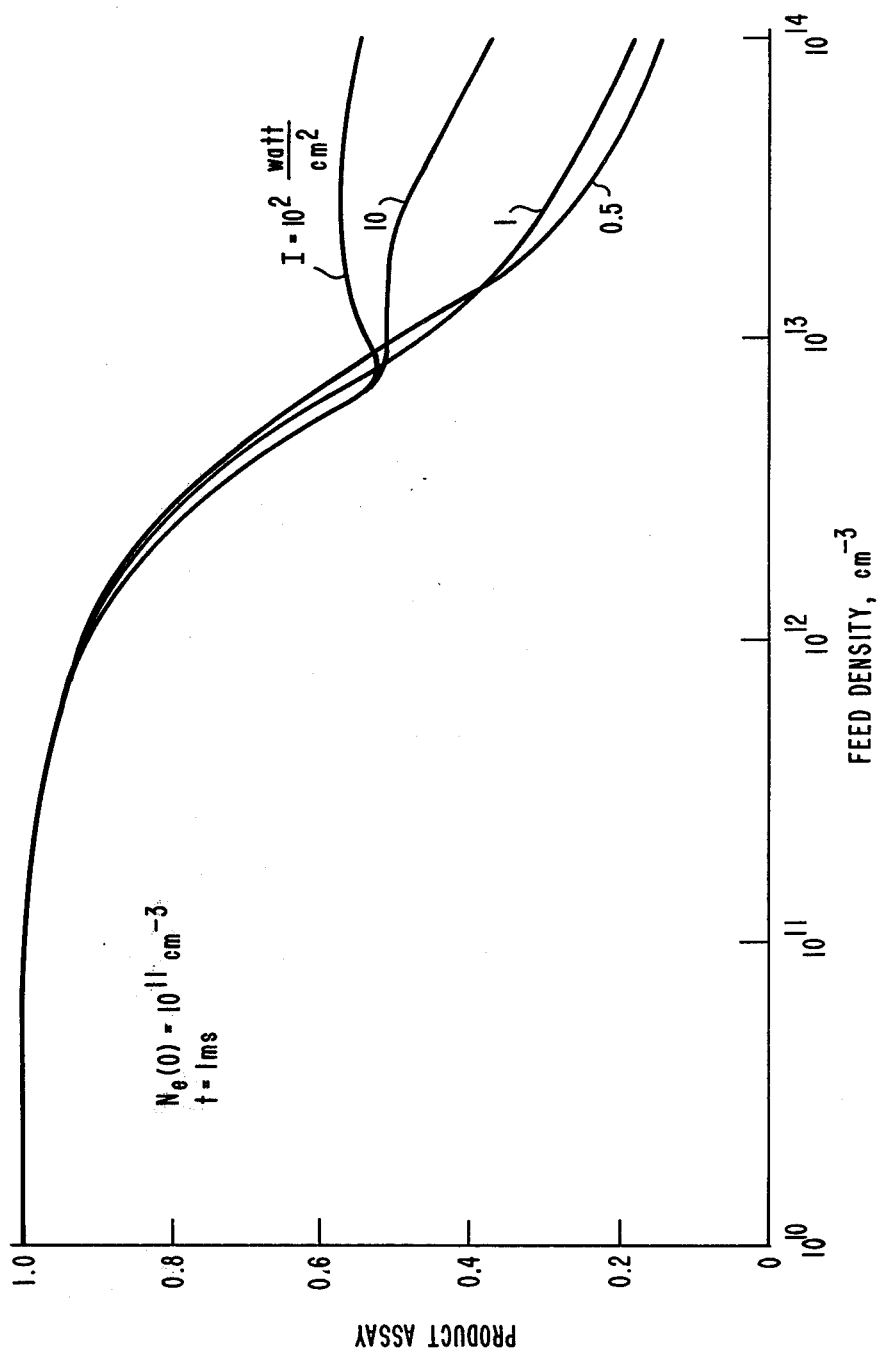
FIG. 6 is a linear-log plot of product assay versus feed density for the given mixture of uranium as a product of the method of this invention.
Figure 7:
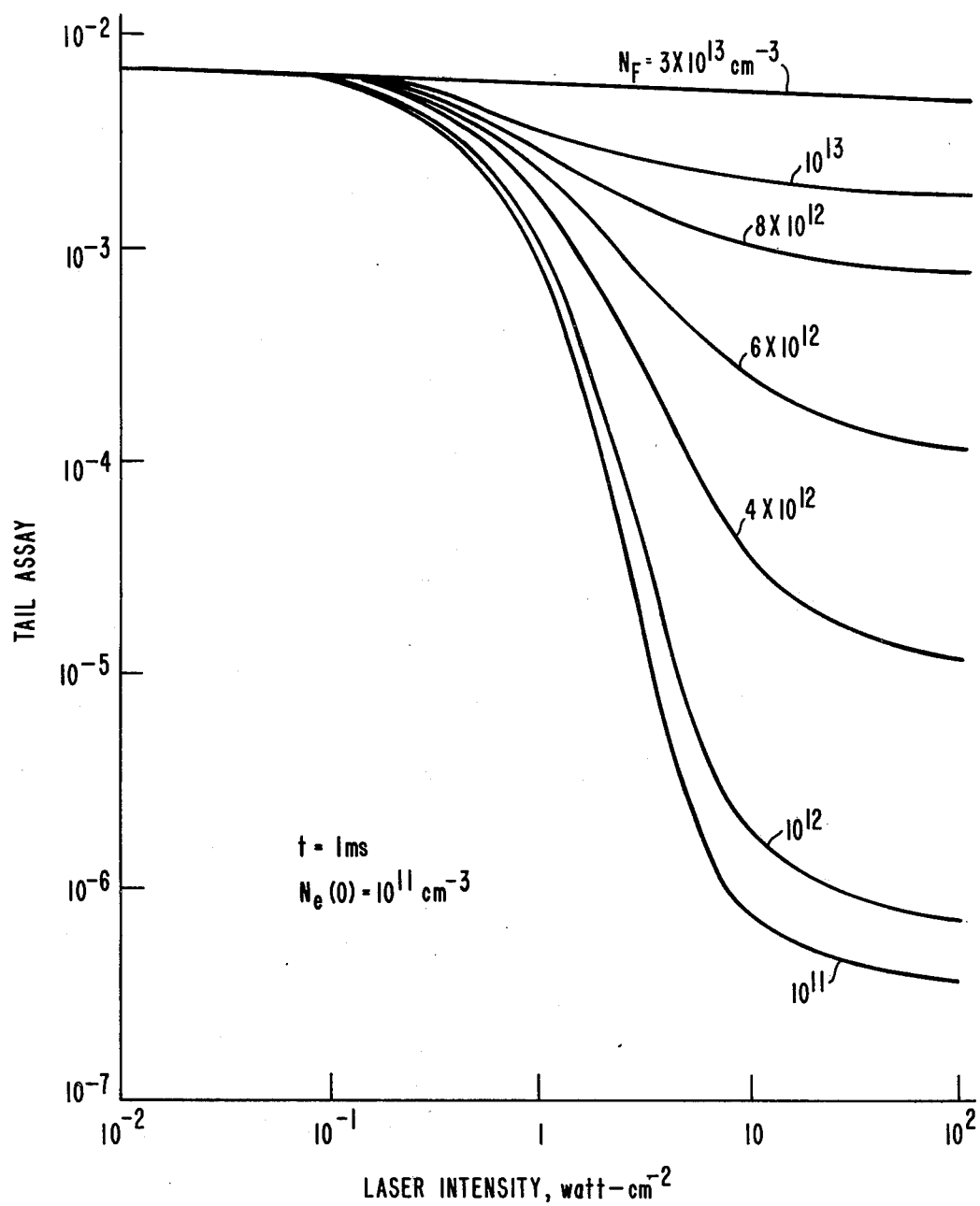
FIG. 7 is a log-log plot of tails assay versus laser intensity for the given mixture of uranium as a product of the method of this invention.
Figure 8:
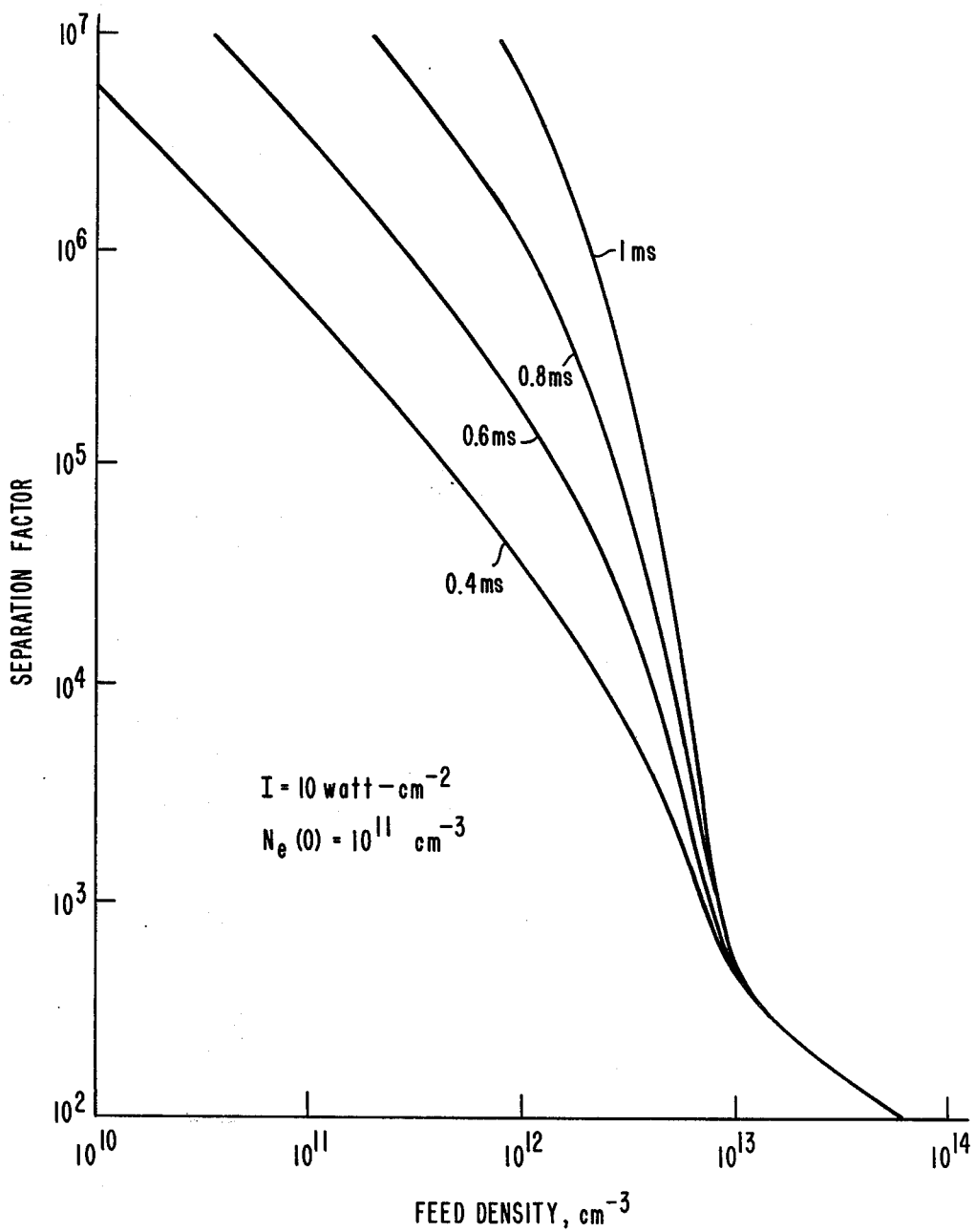
FIG. 8 is a log-log plot of separation factor versus feed density for a given mixture of uranium-employing the method of this invention.

The results of the calculation are summarized in FIGS. 5–8. FIG. 5 is a linear-log plot of cut (the fraction of the feed extracted as product) versus the feed density in molecules (of $^{235}UF_6 + ^{238}UF_6$) per cm$^3$. The results in the Figure refer to a laser power intensity of I=10 watts/cm$^2$ and an initial electron density of $N_e(O) = 10^{11}$ cm$^{-3}$. Each curve is labelled with the parameter t, the time in milliseconds for which the assumed reactions have occurred in the irradiation region. FIG. 6 is a linear-log plot of the Product Assay (the fractional concentration of the desired isotope in the product) versus feed density, as defined above for FIG. 5. Curves are shown for various values of the laser intensity I. The results in all cases correspond to a reaction time t of 1 ms, and an initial electron density of $N_e(O) = 10^{11}$ cm$^{-3}$, as indicated on the Figure. FIG. 7 is a log-log plot of the Tails Assay (the fractional concentration of the desired isotope in the waste) versus the laser intensity. Each curve refers to a particular feed density, as labelled, and the assumed initial electron density $N_e(O)$ and the reaction time t are shown on the Figure. FIG. 8 is a log-log plot of the separation factor (defined as the ratio of the desired to undesired isotope in the product divided by the corresponding ratio in the tails) versus feed density (as defined above for FIG. 5). All curves shown in this Figure correspond to a laser intensity of 10 watts/cm$^2$ and an initial electron density of $10^{11}$ cm$^{-3}$. Each curve refers to a particular reaction time t, as labelled.

At low feed densities virtually all the $^{235}UXY$ and negligible $^{238}UXY$ are dissociatively attached, the cut approaches $7.2 \times 10^{-3}$ (FIG. 5) and the product assay approaches unity (FIG. 6) as expected. As the feed density is increased, a portion of $^{238}UXY$ is also dissociatively attached as a result of vibrational-vibrational transfer, i.e., $$(^{235}UXY)^* + ^{238}UXY \rightarrow ^{235}UXY + (^{238}UXY)^*$$

followed by attachment $$e + (^{238}UXY)^* \rightarrow ^{238}UX^- + Y,$$

where the asterisk indicates the excited species. The de-excited $^{235}UXY$ is then available for re-excitation again in the field of laser irradiation. These v-v transfers and re-excitation processes give rise to the hump in the cut shown in FIG. 5 and the fall of product assay shown in FIG. 6. The peak in the cut-feed density curve corresponds to the case where all the electrons have been used up in attachment, any further increase in the feed density can only result in dilution and reduction of the cut. This phenomenon also contributes to the steep drop in separation factor α as shown in FIG. 8. The parameter in this figure is the time duration for which the isotope-electron mixture has been under laser irradiation. At one millisecond, the reaction is essentially completed.

The required laser intensity is derived from a set of predetermined parameters (i.e. initial electron density, desired tails assay etc.) and FIG. 7. As shown in FIG. 7 the tails assay is a function of laser intensity and feed for a fixed initial electron density. For example, if the tails assay desired is $10^{-3}$ or less, the feed density will be less than or equal to $8 \times 10^{12}$ cm$^{-3}$ and the laser intensity required will be greater than or equal to 10 watts·cm$^{-2}$. Above this feed density, the tail assay is always greater than 10$^{-3}$ irrespective of the laser intensity. This is because the electrons (with a density assumed to be 10$^{11}$ cm$^{-3}$) are exhausted for attachment. Any increase in feed density can only result in diluting the cut (FIG. 5) and improving the product assay negligibly. However, the feed density can be increased approximately proportionally to the initial electron density for the same tails assay provided the laser intensity is adequate.

The low energy electrons for the selective dissociative electron attachment process can be obtained as illustrated in FIG. 1 from a flowing afterglow (the electron-ion plasma remaining after an active electrical discharge) in inert gas. Inert gas is fed into section A where a plasma is created either by dc or radio frequency discharge or by an electron beam. The electron density in the active region is of the order of 10$^{12}$ cm$^{-3}$ for dc or radio frequency discharge and may reach a value of 10$^{13}$ cm$^{-3}$ or higher in an electron beam sustained discharge. The electron temperature in the active region of the incident laser radiation is of the order of 1.5 electron volt. However, it is known that the electron temperature relaxes toward that of the background gas in the afterglow in time of the order of 100 microseconds or less at 1 Torr pressure, and proportionately faster at higher pressure. The mechanism of temperature relaxation is due to the many momentum transfer collisions. At the same time the electron density remains high for a recombination controlled decaying plasma. Typically the density sustains at a level of greater or equal to 10$^{11}$ cm$^{-3}$ at a time a few hundred microseconds in the afterglow. An even higher afterglow density can be achieved from an electron beam generated plasma simply because the initial electron density is much higher. Therefore, the fast decay in energy but slow in number density in an afterglow can provide the low energy electrons with density greater or equal to 10$^{11}$ cm$^{-3}$ in accordance with this invention. There is an additional attraction to an embodiment employing flowing afterglow. The mean electron energy available for attachment purpose has a range of 1 eV to 0.03 eV should the process, depending upon the type of isotope to be separated, call for an electron with energy above the low end of the range. This is achieved by varying the point of injection (region B), of the isotope mixture downstream in the afterglow. The mean electron energy increases the closer the isotope injection point is to the active discharge region.

The isotope shift in the $\mu_3$ vibrational mode of UF$_6$ is in the order of 0.65 cm$^{-1}$. From the point of view of laser technology this is not likely to be a problem in obtaining selective absorption, since source line widths between 0.01 and 0.1 cm$^{-1}$ represents the state of the art at these wavelengths. In accordance with this invention, the densities are necessarily kept low within the order of magnitude of less than 10$^{13}$ cm$^{-3}$ in the above examples calculated for [e] approximately equal to 10$^{11}$ cm$^{-3}$. This order of density would permit operation at temperature as low as 184° K. A reduction in the translational and rotational temperature could be achieved by using adiabitic expansion in the flow duct just prior to the reaction region.

The production rate achieved by a single module embodying the principles described above depends primarily on the size of the flow duct 24 in FIG. 1 and the achievable flow velocity. With a duct of cross-section 10 cm × 10 m, a flow velocity of 5 × 10$^4$ cm/sec, and a reaction time of 1 ms, mirrors of 99% reflectivity will allow the assumed intensity of 10 watts/cm$^2$ to be provided by 50 watts of total injected laser power. If every dissociated product is assumed collectable either chemically and/or physically, the $^{235}$U yield would be 830 grams per day per module.

Thus, the method of this invention for isotope separation provides a unique benefit in that photons and electrons employed are all of low energies. Therefore, the overall energy requirement for this isotope separation process is low providing a desirous cost savings.

We claim as our invention:

1. A method for separating a preselected fragment of a given molecule comprising a preselected isotope out of a gaseous mixture including the given molecule including the steps of:

at least partially confining the gaseous mixture within a bounded container;

selectively exciting the given molecule within the gaseous mixture with only one photon to raise the given molecule to an excited state below its ionization state;

exposing the excited molecules to free electrons generated from an electron source external of the gaseous mixture, having energy at least equal to the dissociation energy of the given molecule in its ground state minus the sum of the energy of the given molecule in its excited state over its ground state and the electron affinity of the fragment of the given molecule to which the electron attaches, which then dissociates to form fragments one of which is the preselected fragment;

concentrating the preselected fragments of the given molecule within a portion of the gaseous mixture so that the portion of the gaseous mixture receiving the concentration of the preselected fragments is substantially enriched in the preselected fragments; and separating the portion of the gaseous mixture enriched in the preselected fragments resulting from dissociative electron attachment from the remainder of the gaseous mixture so the enriched portion can be processed to recover the preselected isotope in a preferred form.

2. The method of claim 1 wherein the free electrons are created from an electron beam sustained discharge.

3. The method of claim 1 wherein the separating step includes the step of electrically separating fragment ions.

4. The method of claim 1 wherein the separating step separates fragment ions of the preselected isotope of the given molecule.

5. The method of claim 1 wherein:

the gaseous mixture including the given molecule is continuously introduced into the bounded container at one end and flows through the bounded container;

the exciting step continuously irradiates the gaseous mixture downstream of the point where the gaseous mixture is introduced, with a continuous wave laser positioned exterior of the container and focused through a window in the boundary of the container;

the exposing step continuously exposes the excited molecules to free electrons;

the concentrating step continuously concentrates preselected fragments of the given molecule into a portion of the total gaseous mixture downstream of the point wherein the excited molecules are exposed to free electrons; and the separating step continually separates the enriched portion of the gaseous mixture from the remainder of the gaseous mixture to permit continual processing of the enriched portion of the gaseous mixture to enable continuous recovery of the preselected isotope in its preferred form.

6. The method of claim 1 wherein the exposing step includes the step of creating the free electrons from a flowing afterglow of an electron discharge.

7. The method of claim 6 wherein the energy of electrons in the afterglow varies between 0.03 eV and 1 eV.

* * * * *